Mar. 27, 1923.
E. HIATT
1,450,082
HEADLIGHT SHELTER
Filed Oct. 12, 1921     2 sheets-sheet 1
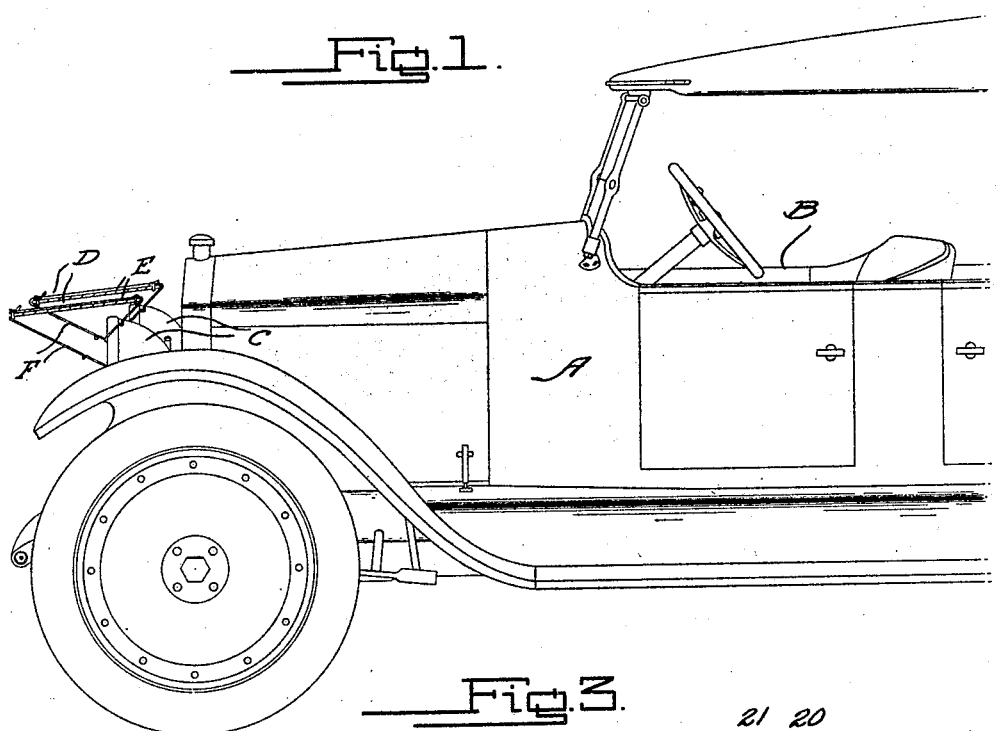
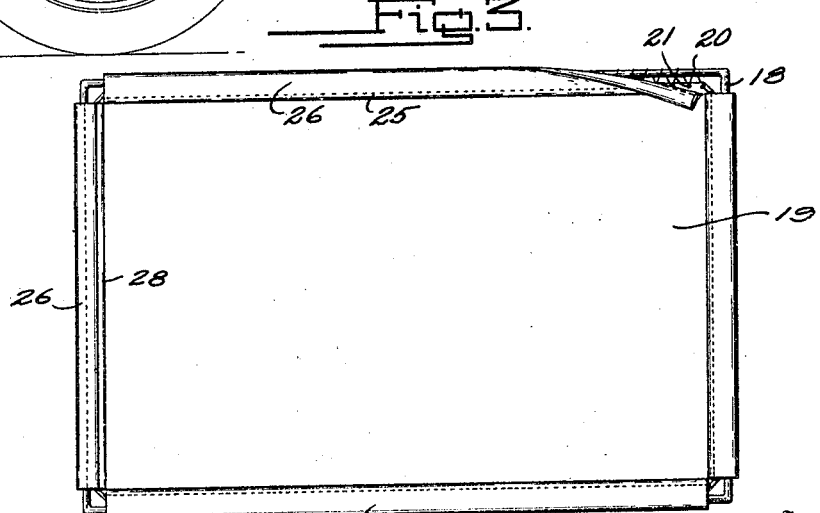
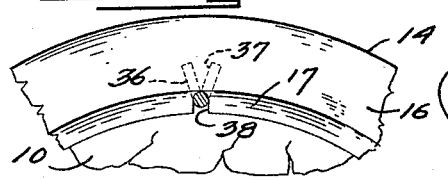
Inventor
Elmer Hiatt.
By Lancaster and Allwine
Attorneys

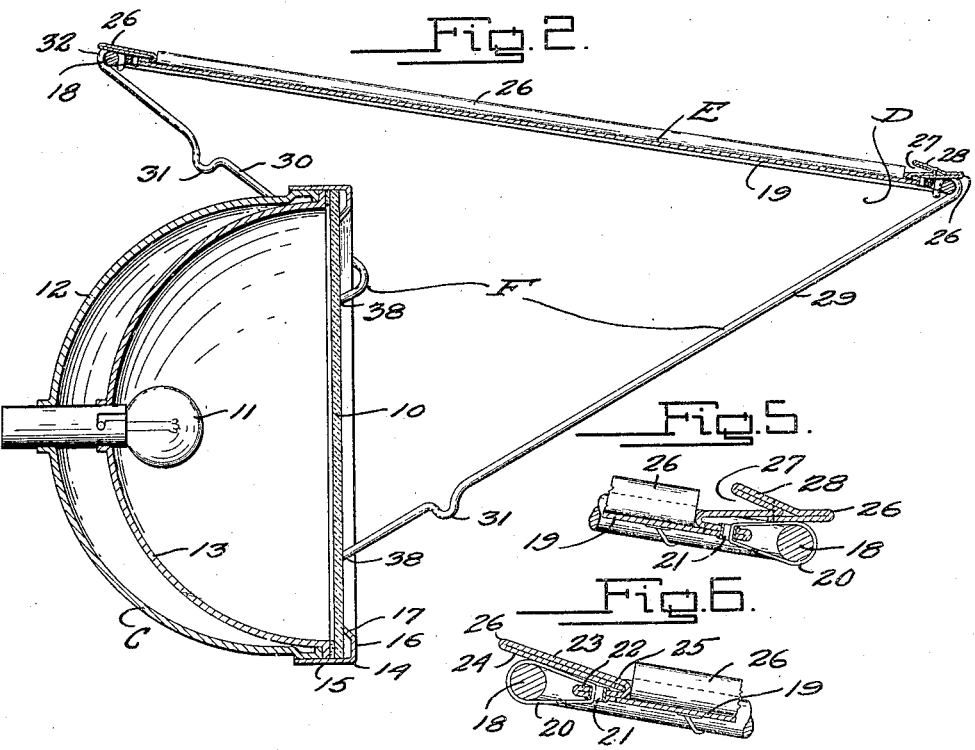
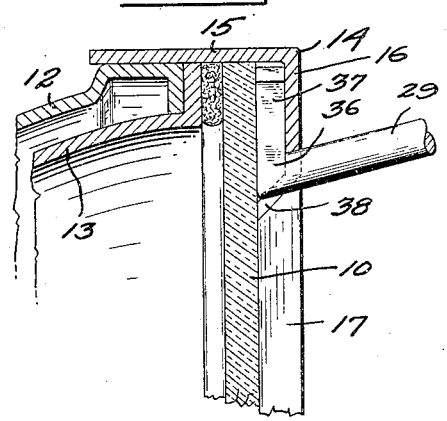
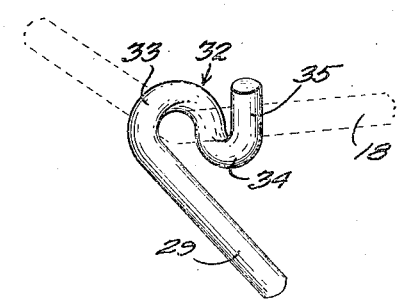
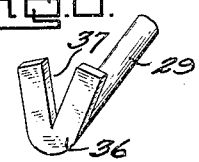

Patented Mar. 27, 1923.

1,450,082

UNITED STATES PATENT OFFICE.

ELMER HIATT, OF NEWCASTLE, INDIANA.

HEADLIGHT SHELTER.

Application filed October 12, 1921. Serial No. 507,179.

*To all whom it may concern:*

Be it known that I, ELMER HIATT, a citizen of the United States, residing at Newcastle, in the county of Henry and State of Indiana, have invented certain new and useful Improvements in Headlight Shelters, of which the following is a specification.

My present invention relates to shelters or protectors for head lamps of vehicles such as automobiles, trucks, tractors, etc., and is of that character to prevent rain, snow and sleet from finding its way to and accumulating on the lenses of the lamps.

The head lamps of vehicles as heretofore commonly used, in an exposed position, have been found inefficient during storms, when their use is most desired to illuminate the path of travel in advance of the vehicle, due to the rain, snow or ice accumulating on the lens and obstructing the rays of light to that extent where insufficient illumination results. This is especially true in connection with lamps equipped with lenses which have their outer faces provided with projections or configurations intended to bend and diffuse the light rays to definite desirable directions, but which projections or configurations have a tendency to catch and retain drops of rain, flakes of snow, etc. and since such types of lens are in common use, the present invention is particularly desirable, constituting primarily a shelter for such lens so that the rain is either caught by the shelter and drained from proximity to the lens, or deflected from its path by air currents resulting from movement of the vehicle and more particularly by the relative position of the shelter to the lamp. Snow is likewise caught by the shelter when the vehicle is not traveling, and either caught or deflected from proximity to the lens when the vehicle is traveling.

One of the principal objects of the present invention is therefore to provide a device which will contribute toward the prevention of accidents and render the driving of vehicles less hazardous at night by maintaining the efficiency of the head lamps.

Other objects and advantages of the invention are, to provide a device which is efficient for the purpose above set forth but which will not obstruct the normal line of vision directed to the roadway in front of the vehicle when traveling during day time or at night, a device which will add to the appearance of the vehicle and which may be made to harmonize with the color scheme of the vehicle by the provision of parts readily changed to meet the requirements of color scheme, or season; and to provide a device which may be manufactured at a low cost, easily installed without the aid of skilled labor and readily adjusted to maintain its efficiency even though subjected to exposure during prolonged periods of stormy weather.

Other objects and advantages of the invention will appear in the following detailed description of the preferred embodiment of the invention, taken in connection with the accompanying drawings, forming a part of this specification and in which drawings:

Figure 1 is a perspective view of the forward portion of an automobile equipped with head lamp shelters constructed and arranged according to my invention.

Fig. 2 is an enlarged central vertical sectional view through one of the head lamps and its shelter.

Fig. 3 is a top plan view of the main body portion of the shelter.

Fig. 4 is a fragmentary enlarged sectional view through a portion of the lamp showing by way of example one way of attaching the shelter to the lamp.

Fig. 5 is a similar view through a portion of the main body of the shelter showing a water drain preferably at the forward end portion of the device.

Fig. 6 is a similar view of Fig. 5 but at the rear portion of the device.

Fig. 7 is a fragmentary perspective view of the upper end portion of one of the supports of the shelter.

Fig. 8 is a similar view of the lower portion of such support.

Fig. 9 is a front elevation of a fragment of the lamp showing one way of disposing the support in fixed relation to the lamp.

In the drawings where similar characters designate like or corresponding parts throughout the several views, A designates a vehicle including a drive compartment B and head lamps C in advance of said compartment; and D, shelters for the lamps each comprising a roof-like shield E and a support F therefor.

The lamps C may be of any suitable design or configuration each including a lens 10 through which the rays from light 11 are emitted. The lamp in the example shown has a main body portion 12 of parabolic shape; a reflector 13 therein for the light rays, and a lens retaining ring 14 having a flange 15 engaging the lamp body 12 and an inwardly extending flange 16 disposed in front of the lens 10 and in spaced relation thereto except at its innermost inturned flange extension 17. The foregoing is merely set forth, by way of example, as showing one way, as hereinafter set forth, by which the shelter may be readily attached to the lamp.

The roof-like shield E of the shelter is preferably rectangular in shape although it is to be understood that the shape of this device may be altered, so as to harmonize with some design, peculiar to particular makes of vehicles. It comprises, in the example shown, a frame 18, preferably made of wire, rectangular in shape; a flexible sheet-like member traversing the frame 19 and detachable therefrom; and a device 20 for drawing and retaining the sheet-like member taut on frame 18. The sheet-like member 19 may be of fabric, leather, rubber or any suitable material and of any suitable color, or colors, preferably having its under side green and its upper side of the same color as the automobile top, or to conform to the color scheme of the car. The device 20, may consist of a draw string or cord, looped about the frame 18, and through eyelets 21 provided in the marginal portion of the sheet-like member 19. In order to provide a substantial thickness of material through which the eyelets 21 extend, the marginal portions of the sheet-like member 19 may be formed by doubling the material upon itself, as indicated at 22, reference being had more particularly to Figures 5 and 6 of the drawings, so that there is a double thickness of material at the marginal portions carrying the eyelets 21. If desired the sheet-like material may be continued on at the marginal portions, and bent away from the central portion as indicated at 23, and then doubled upon itself as at 24, with a line of stitching indicated at 25, securing the two plies of material at the marginal portion together, forming a flap 26 which overlies the lacing cord 20, and also has a tendency to direct any drops of rain, or melting snow, toward the lower corners of the shield. One marginal portion of the shield may be provided with a trough 27, which may be formed by doubling the material of one of the flaps 26, forming an upstanding rib 28, clearly shown in Figure 5 of the drawings, this rib extending, in the example shown, transversely of the shield, so as to carry the water off to the side of the shield, remote from the lens 10 of the lamp.

The support F may comprise a plurality of relatively long legs 29 and plurality of relatively short legs 30, the former extending downwardly and backwardly from the forward end portion of the shield E, to the lower portion of the lamp C, and the latter extending downwardly from the rear portion of the shield E, forwardly, and connected to the upper portion of the lamp C. These legs may be formed of wire and are preferably provided with rain drips 31, which may be in the nature of downwardly extending U-shaped portions of the run of wire. In order that these legs may be detachably connected with the shield E and the lamp C, the upper ends of the legs may be provided with embracing heads 32 formed to provide a portion 33 looped over the frame 18 at one corner thereof at one side member of the frame, a portion 34 looped under the adjacent side portion of the frame at the corner thereof, and an upstanding terminal 35 disposed at the exterior of the frame. This head enables a person to quickly dispose the leg in operative relation for supporting the shield, or to quickly remove it from operative relation to the frame, when it is desired to pack or store the device. Each leg 29 may be provided with a foot 36 in angular relation to the main body portion of the leg, and which may be bifurcated as indicated at 37 for a purpose to be subsequently set forth. In order to connect these supports with the lamp it is merely necessary to remove the lens retaining ring 14 and provide, as by filing, suitable notches 38 in the flange extension 17 to receive the leg 29 at its juncture with foot 36, the said bifurcated portion 37 of the latter being clamped between the lens and retaining ring 14 when the latter is again returned into operative relation to the lamp body 12. It is to be understood that the foregoing is merely by way of example, it being possible to support the shield E above, and in spaced relation to the lamp, by other kinds of supports, and by other types of connections with the lamps.

It is preferred to dispose the shield so that its major portion is above and in front of the lens 10, as clearly shown in Figure 2 of the drawings, and it is preferred to tilt the shield so that its forward end portion is lowermost, thus causing the rain, or melted snow to flow to the trough 27 and be delivered therefrom at points remote from the path of the lens. This tilting of the shield also enables the shelter to be used, without obstructing the line of vision directed to the roadway in front of the vehicle and the desired angle of inclination, if such is desired, may be adjusted by bending the legs 29. It may be observed that a person occupying the operators compartment will not find these shelters a source of annoyance for they do not materially obstruct the view of the road way in front of the vehicle, and may be adjusted so that only the edge of the material will be in the line of vision of the driver. Disposing the shield in spaced relation to the lamp permits currents of air to carry off flakes of snow which may have a tendency to blow beneath the shelter and also permit of a sufficient current of air to cool the lens, so that products of condensation will not gather thereon.

Changes in details may be made without departing from the spirit or scope of my invention; but,

I claim:

1. A head lamp shelter comprising a roof-like shield, means for supporting said shield above the lamp, and means carried by said shield to drain water therefrom at a point to one side of the path of travel of the lens of the lamp.

2. A head lamp shelter comprising a roof-like shield including a frame, a flexible sheet-like member traversing said frame and detachable therefrom, and means for drawing and retaining said sheet-like member taut thereon, and means for supporting said shield above the lamp.

3. A head lamp shelter comprising a roof-like shield, and legs extending downwardly from said shield and adapted for attachment to the lamp adjacent the lens thereof, said legs provided with rain drips intermediate their ends.

ELMER HIATT.